United States Patent Office 2,965,745
Patented Dec. 20, 1960

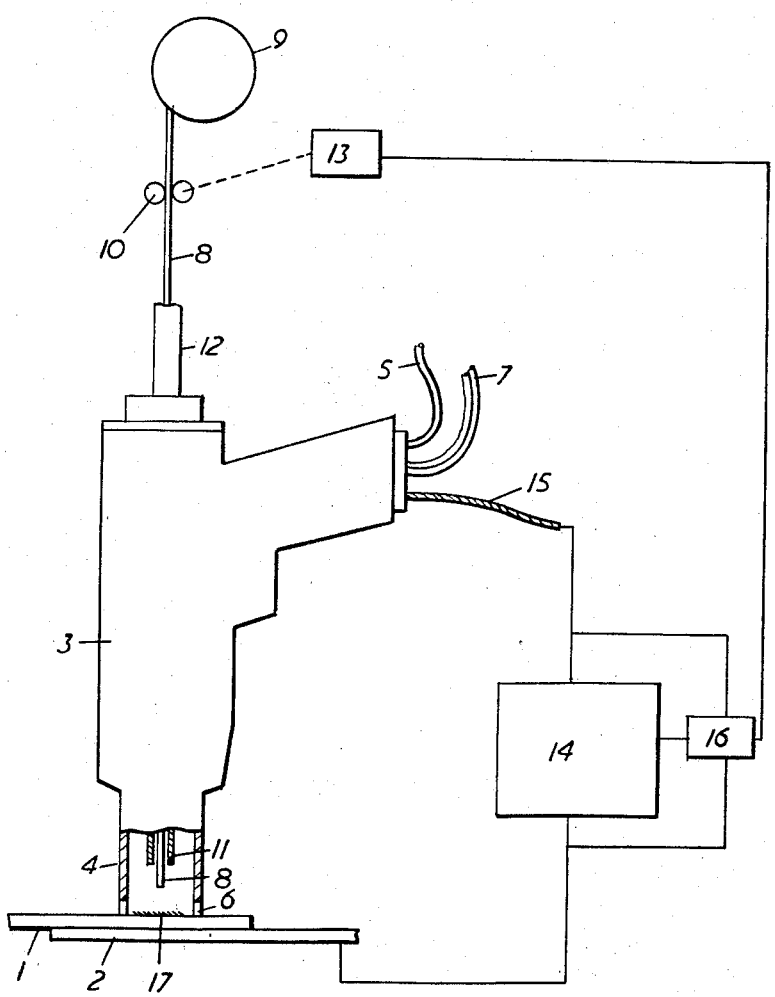

2,965,745

ELECTRIC ARC WELDING OF ALUMINUM

John Edward Hardy, Pyrford Woods, and Lawrence Joseph Brittaine, Morden, England, assignors to The British Oxygen Company Limited, a British company Filed Jan. 19, 1959, Ser. No. 787,660

Claims priority, application Great Britain Jan. 23, 1958

3 Claims. (Cl. 219—127)

This invention relates to processes for the electric arc welding of aluminum and aluminum alloys using a consumable electrode.

The consumable electrode gas shielded arc welding process is successfully used for the seam welding of aluminum and its alloys but difficulty has been found in spot or track welding such materials by this process. In all electric spot welding processes it is necessary to limit the duration of the flow of welding current by suitable timing means. In the case of electric arc spot welding the timing cycle is conveniently initiated when the consumable electrode wire, which is fed towards the workpiece to strike the welding arc, contacts the surface of the workpiece. This arrangement gives good results when the workpiece is of ferrous material but has not been found reliable when applied to aluminum and aluminum alloys. For good spot welds reliable and instantaneous arc initiation is essential since the spot weld timing cycle is relatively short, of the order of 1 second, say, depending upon the thickness of the workpiece. Any hesitancy or irregularity of the welding arc results in a variation of the period during which heat is supplied from the welding arc, with consequent variation of weld penetration.

It is an object of the present invention to provide a process of this kind in which consistent initiation of the welding arc is achieved more reliably than hitherto.

According to the present invention, in a process for the electric arc welding of a workpiece of aluminum or aluminum alloy in which a consumable electrode wire is fed automatically towards a surface of the workpiece to initiate a welding arc, initiation of the welding arc is assisted by the presence between the surface and the electrode of aluminum in powdered or fragmentary form.

The aluminum may be applied to the surface of the workpiece as a coating or surface layer of powder, or of fragmnetary aluminum such as small chips or turnings. This coating or surface layer need be applied only at regions where the welding arc is to be initiated.

To prevent or minimise disturbance of the coating or surface layer by a flow of shielding gas to the welding zone the aluminum may be mixed with a carrier liquid such as alcohol and applied to the surface as a slurry for example Alternatively, aluminum powder may be entrained in the shielding gas for the welding zone and delivered to the welding zone when a welding arc is to be initiated.

The invention will now be described as applied to an inert gas shielded electric arc spot welding process for joining overlapped sheets of aluminum or aluminum alloy. In one such process, illustrated in the accompanying drawing, overlapped sheets 1, 2 of aluminum or aluminum alloy are to be welded together using a spot welding gun 3. The nozzle 4 of this gun is held in contact with one of the sheets 1. Shielding gas, such as argon, is supplied via a pipe 5 to purge the space within the nozzle 4 of deleterious gases, which escape through notches 6 in the nozzle. Cooling fluid is supplied to, and carried away from, the spot welding gun 3 via the pipes 7. A consumable electrode 8 of aluminum wire is fed through a flexible guide sleeve 12 from a spool 9 by feed rolls 10 operated by an electric motor 13 towards the sheets 1, 2 to be welded. Welding current is supplied to the consumable electrode 8 through a cable 15 and contact tube 11 from a welding power supply unit 14.

When the electrode 8 contacts powdered or fragmentary aluminum 17 on the surface of the work 1, an electrical circuit is immediately completed since the powder 17 bridges the gap between the electrode 8 and the workpiece 1 and welding current flows. The completion of this electrical circuit sets a timing relay 16 into operation, and this timing relay interrupts firstly the electrode feed and, after a burn-back period, the flow of welding current after a predetermined time sufficient to allow the production of a good weld but insufficient to allow the welding arc to burn through the workpieces being welded In an alternative form of the process the welding current may be interrupted by allowing the welding arc to burn back the electrode, when the electrode feed is interrupted, until the arc voltage is insufficient to maintain an arc. It will be appreciated that this delay time will vary for different workpieces and welding conditions. Normally in this process the electrode feed speed is between 200 and 300 inches per minute, and if desired it may be arranged to be increased when the electrode contacts the workpiece. The length of electrode wire consumed during each spot weld is of the order of a few inches.

Delays, even of short duration, in initiating the welding arc will have an appreciable effect on the weld produced, and an adverse effect on the reproducibility of the process, since the welding cycle is of the order of only 1 second depending on the thickness of the workpiece being welded.

Difficulties due to delayed arc initiation were in fast encountered when spot welding two overlapped commercially pure aluminum plates each of 1/16 inch thickness by means of this process using as an electrode a 1/16 inch diameter commercially pure aluminum wire fed at the rate of 240 inches per minute during the welding cycle. Reliable and instantaneous initiation of welding arc, resulting in satisfactory welds, was however obtained when use was made of the present invention.

In order to achieve this improvement, aluminum powder incorporated in a slurry with alcohol was applied in a thin coating to those regions of a surface of the workpiece in which spot welds were to be made.

An improvement in arc initiation may also be obtained if the aluminum present between the workpiece and the electrode tips is in the form of a dry powder, or small chips or turnings. Aluminum in powder form may also be introduced by way of the shielding gas, a small quantity of aluminum powder being dispensed into the flow of shielding gas for the arc at the beginning of the spot welding cycle.

When use is made of the present invention, the metallic aluminum in powdered or other fragmentary form is momentarily trapped between the surface of the workpiece and the electrode tip as the electrode is fed into contact with the workpiece. The very high current densities which result in proximity to the electrode tip as the result of the small area of physical contact between the electrode tip and the surface of the workpiece are believed to assist the prompt initiation of the welding arc.

We claim:

1. An electric arc welding process of the kind in which a wire electrode is fed at speeds of hundreds of inches per minute towards a workpiece in a shielding gas to supply metal to the weld, the electrode feed commencing before the welding arc is initiated and not being interrupted until after an electrical control circuit has been completed through the electrode wire and workpiece, and in which welding current flows for a predetermined time when electrical contact is made between the electrode wire and the workpiece, characterised in that initiation of the welding arc is assisted, when welding a workpiece of material selected from the group comprising aluminum and aluminum alloy using an electrode wire of material selected from the group comprising aluminum and aluminum alloy, by providing on the surface of the workpiece a layer of finely divided aluminum which bridges the gap between the workpiece and the tip of the wire electrode as the electrode is fed towards the workpiece.

2. An electric arc welding process in accordance with claim 1, characterised in that the finely divided aluminum is applied to the workpiece mixed with a carrier liquid.

3. An electric arc welding process in accordance with claim 1, characterised in that the finely divided aluminum is entrained in the shielding gas and delivered to the welding zone when a welding arc is to be initiated.

References Cited in the file of this patent

UNITED STATES PATENTS

| | | |
|---|---|---|
| 1,589,017 | Lincoln | June 15, 1926 |
| 2,115,707 | Crecca et al. | May 3, 1938 |
| 2,430,055 | Kennedy | Nov. 4, 1947 |
| 2,814,719 | Wilson | Nov. 26, 1957 |